Nov. 25, 1930.   W. FERGUSON   1,783,077
SHEET METAL BUMPING OUT TOOL
Filed May 4, 1928   5 Sheets-Sheet 1
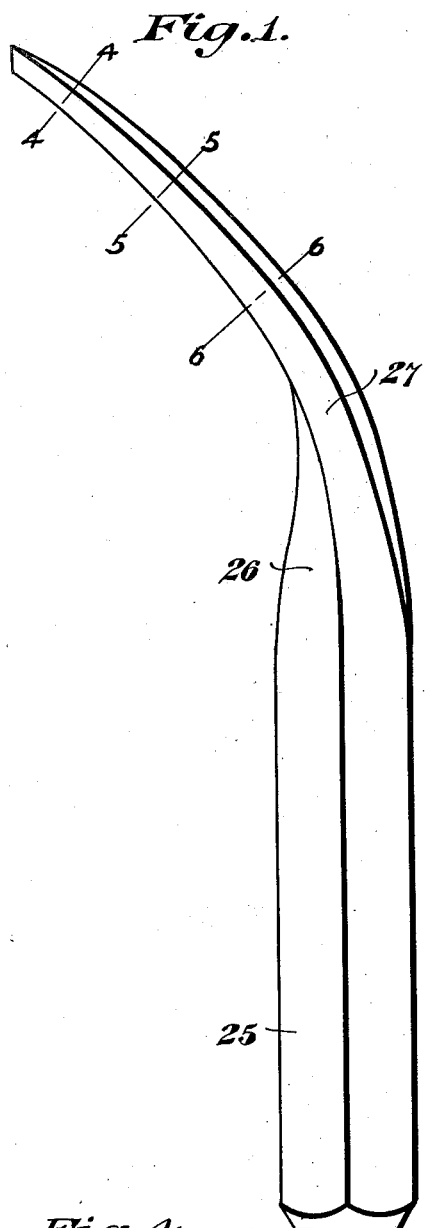
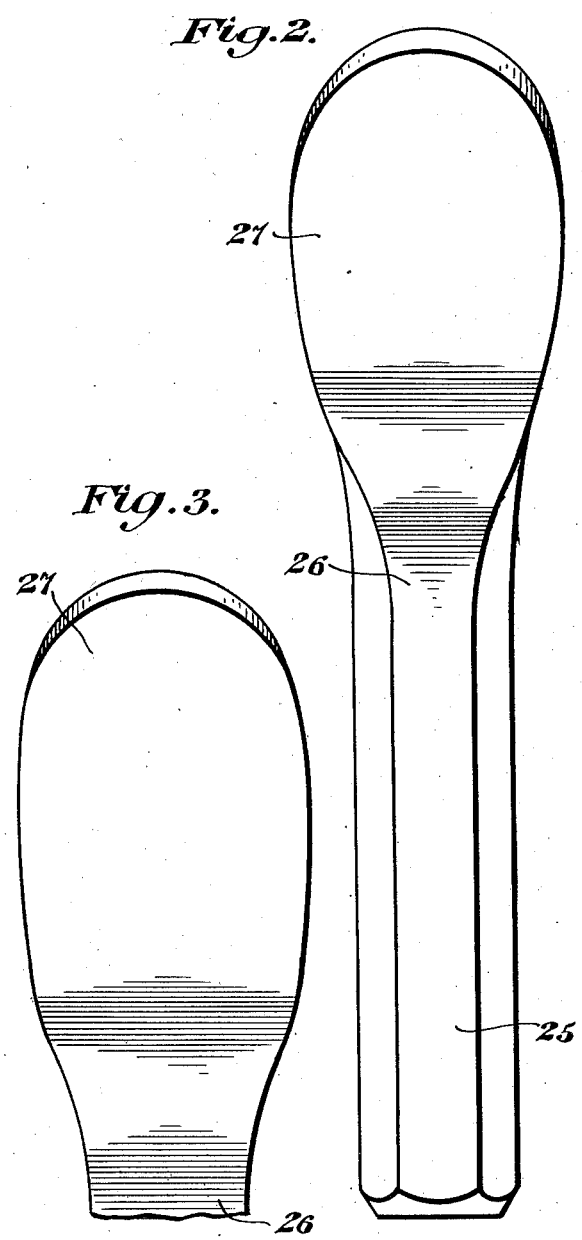
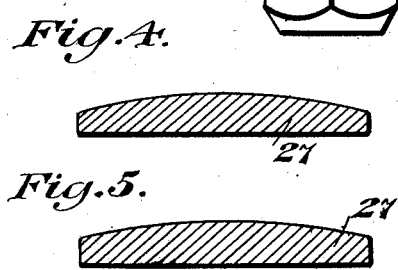
INVENTOR.
William Ferguson,
BY
Geo. P. Kimmel
ATTORNEY.

Nov. 25, 1930.　　　W. FERGUSON　　　1,783,077
SHEET METAL BUMPING OUT TOOL
Filed May 4, 1928　　　5 Sheets-Sheet 2
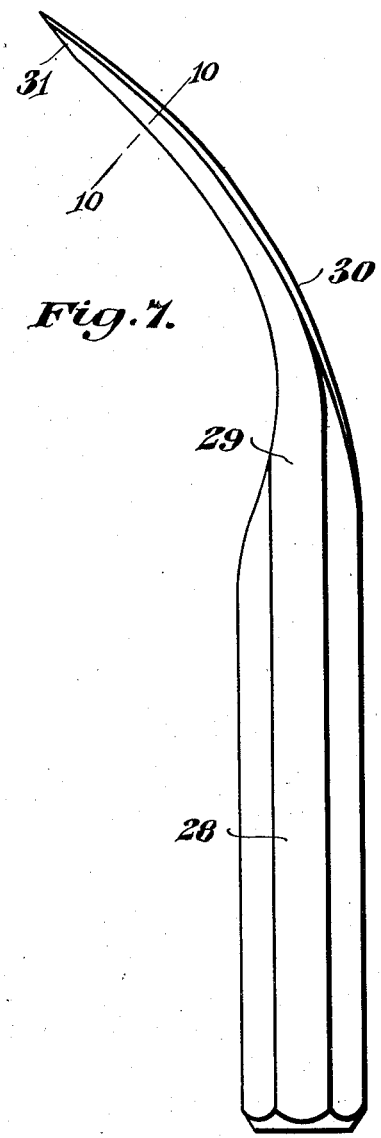
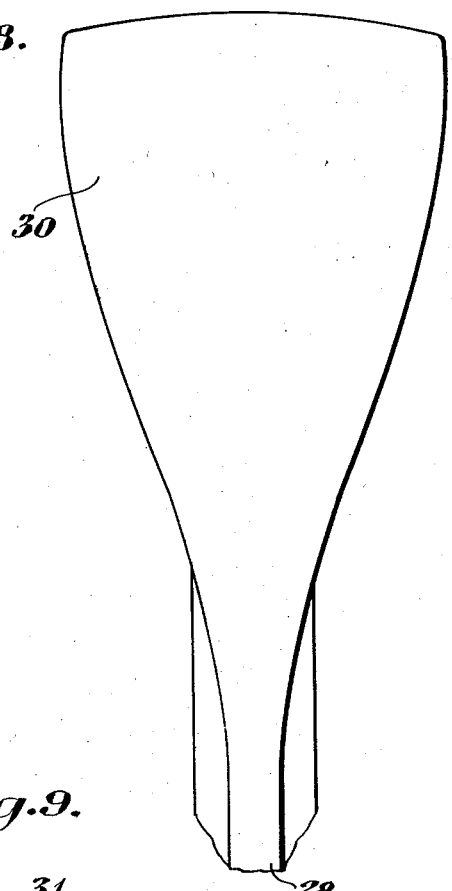
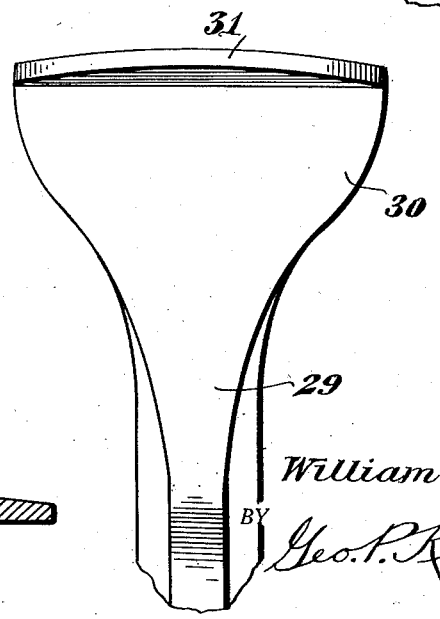
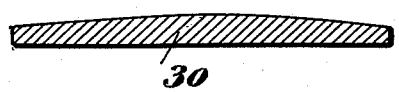
INVENTOR.
William Ferguson,
BY Geo. P. Kimmel
ATTORNEY.

Nov. 25, 1930.  W. FERGUSON  1,783,077
SHEET METAL BUMPING OUT TOOL
Filed May 4, 1928  5 Sheets-Sheet 3

INVENTOR.
William Ferguson,
BY
Geo. P. Kimmel
ATTORNEY.

Nov. 25, 1930.  W. FERGUSON  1,783,077
SHEET METAL BUMPING OUT TOOL
Filed May 4, 1928   5 Sheets-Sheet 4
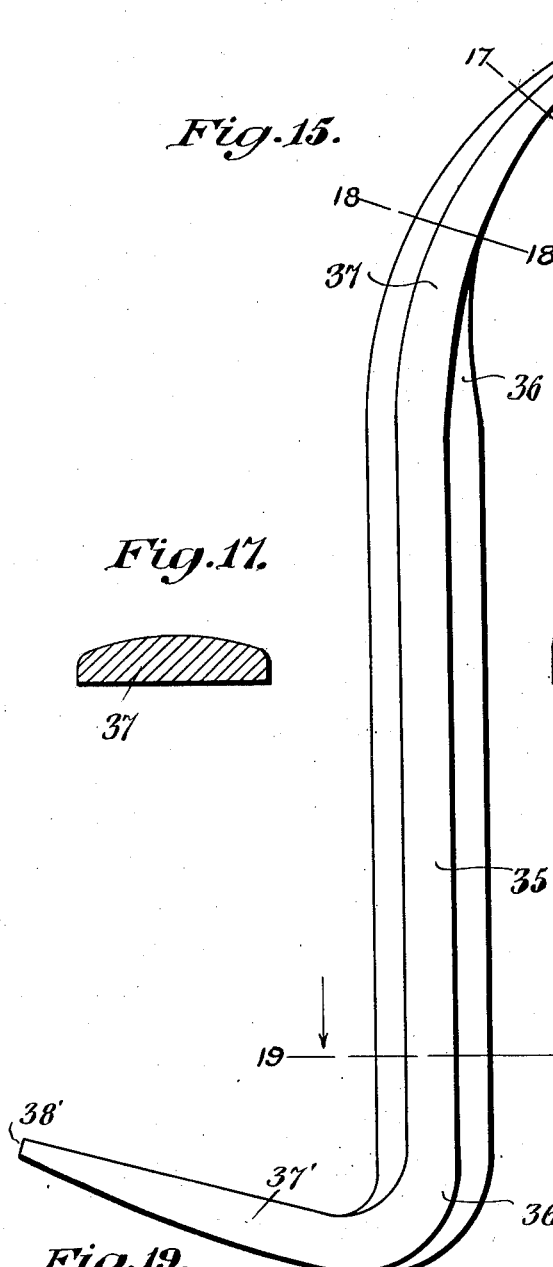
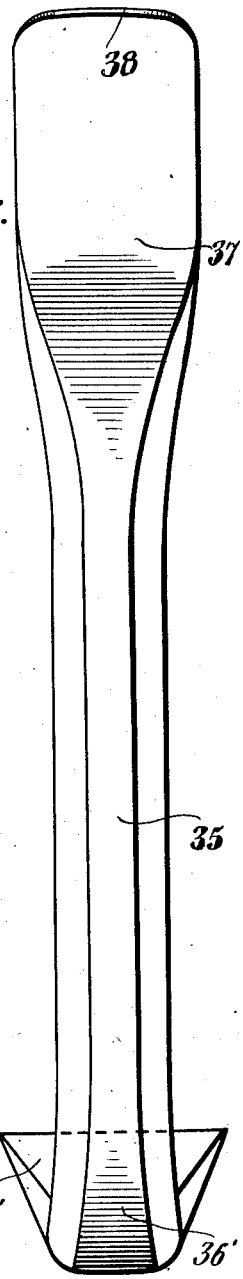
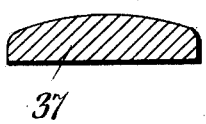
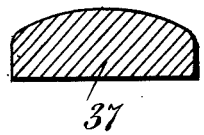
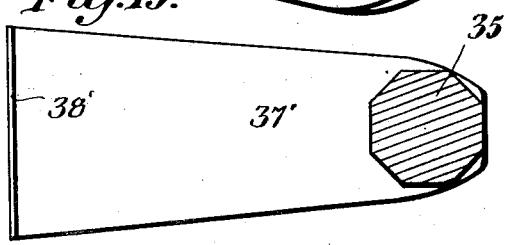
INVENTOR.
William Ferguson,
BY Geo. P. Kimmel.
ATTORNEY.

Nov. 25, 1930.  W. FERGUSON  1,783,077
SHEET METAL BUMPING OUT TOOL
Filed May 4, 1928  5 Sheets-Sheet 5
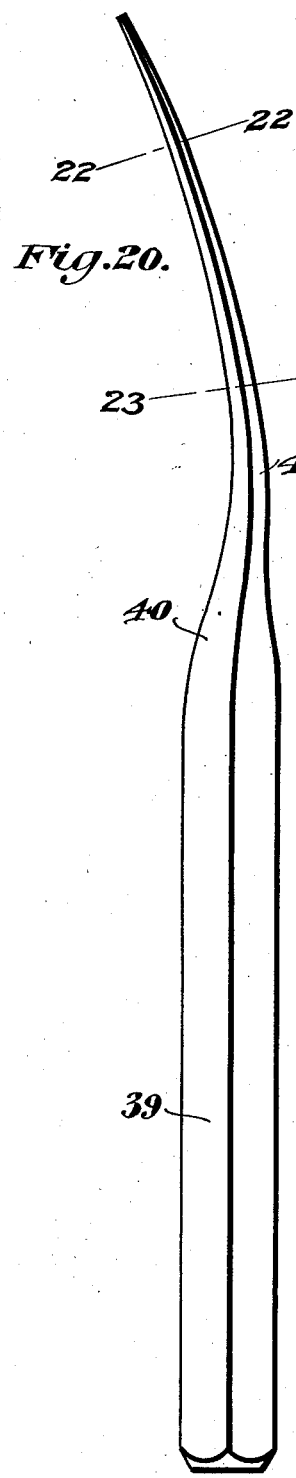
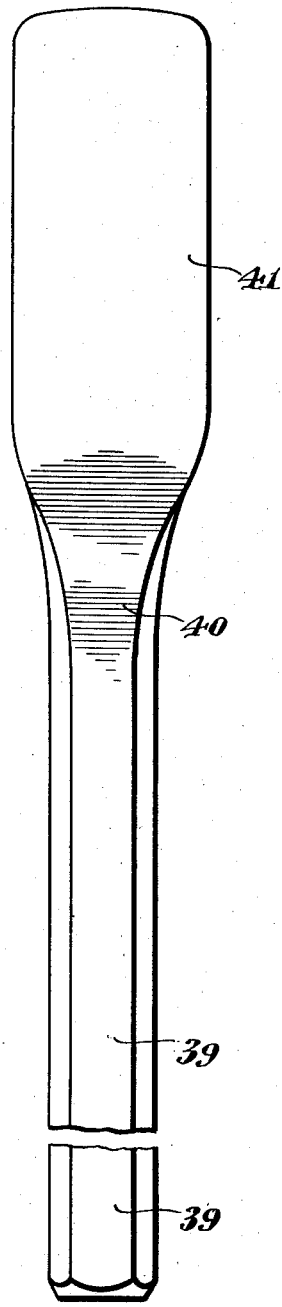
INVENTOR.
William Ferguson,
BY Geo. P. Kimmel
ATTORNEY.

Patented Nov. 25, 1930

1,783,077

UNITED STATES PATENT OFFICE

WILLIAM FERGUSON, OF FLINT, MICHIGAN

SHEET-METAL-BUMPING-OUT TOOL

Application filed May 4, 1928. Serial No. 275,217.

This invention relates to tools to be used for metal bumping work, more particularly for use in bumping out indentations in automobile bodies due to collisions and accidents, and the invention has for its object to provide a tool of such class, in a manner as hereinafter set forth for reaching a certain part of an automobile body without the necessity of tearing down the inner frame or supporting structure to get at the indentation in the metal for the purpose of bumping it out.

In removing indentations from the sheet metal body and fenders of an automobile it is now the usual practice to hold a metal block or dolly against the inner face of the indented structure while blows are delivered to the outer surface.

It frequently happens however that access to the inner surface of the indented portion of the automobile is obstructed by adjacent braces, beams or backing frame so that the dolly or bumping-out block can not be held against the surface to be bumped out until the obstructing structure has been removed.

The present invention is therefore directed to a group of differently shaped bumping-out tools designed for use in bumping out or straightening different portions of the sheet metal structure of an automobile. Each of the tools illustrated consists of a handle having a flattened portion at an end thereof constituting an anvil adapted to be held against the work being bumped out, and the anvils are differently shaped and disposed at different angles to their handles to facilitate their use in various positions where the surface to be bumped out is more or less obstructed by braces, beams or other supporting structure. Furthermore the bumping surface of each anvil is curved to conform more or less accurately to the desired curvature of the surface to be bumped out.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of a tool in accordance with this invention for bumping out metal.

Figure 2 is a front elevation thereof.

Figure 3 is a fragmentary view in front elevation upon an enlarged scale.

Figures 4, 5 and 6 are respectively sections on lines 4—4, 5—5 and 6—6 of Figure 1.

Figure 7 is a side elevation of another form of tool in accordance with this invention for bumping out metal.

Figure 8 is a fragmentary view in rear elevation thereof.

Figure 9 is a fragmentary view in front elevation of the form of tool shown in Figure 7.

Figure 10 is a section on line 10—10 of Figure 7.

Figure 11:
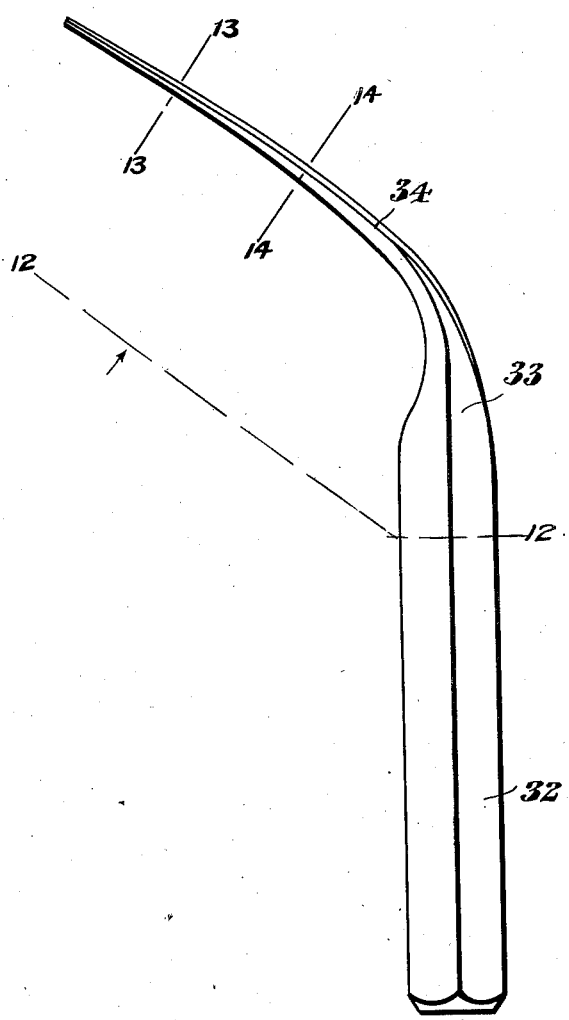

Figure 11 is a side elevation of still another form of tool in accordance with this invention for bumping out metal.

Figure 12:
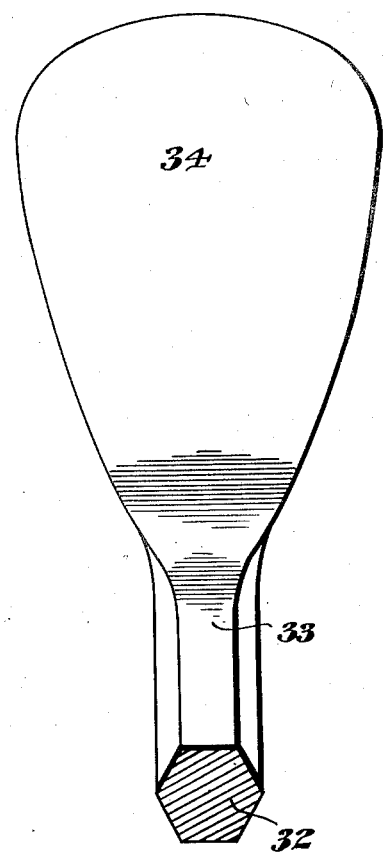
Figure 13:
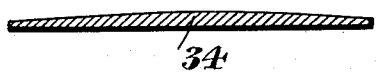
Figure 14:

Figures 12, 13 and 14 are respectively sections on lines 12—12, 13—13 and 14—14 of Figure 11.

Figure 15 is a side elevation of still another form of tool in accordance with this invention for bumping out metal.

Figure 16 is a front elevation thereof.

Figures 17, 18 and 19 are respectively sections on lines 17—17, 18—18 and 19—19 of Figure 15.

Figure 20 is a side elevation of still another form of tool in accordance with this invention for bumping out metal.

Figure 21 is a rear elevation thereof broken away.

Figures 22 and 23 are sections on lines 22—22, 23—23, respectively, of Figure 20.

Figure 24 is a view looking toward the free end of the handle of the tool.

The tool as illustrated in Figures 1 to 6 is what is termed a heavy fender spoon and comprises a handle 25 of appropriate length and preferably of polygonal cross section to facilitate gripping the same in the hand. One end of the handle 25 is tapered as at 26 and merges into an inclined anvil 27 curved lengthwise thereof from end to end. The anvil 27 gradually decreases in thickness from its inner to its outer end and has its rear face of arcuate curvature transversely. The anvil 27 is of spoon-like form and has a rounded free end. The inner portion of the anvil is flared and it merges into a substantially oval-shaped portion which is of greater length than the tapered portion. The anvil is disposed at an acute angle with respect to the longitudinal axis of the handle 25.

The bumping-out tool of Fig. 1 may be employed in various operations but is particularly well adapted for use in straightening out the fenders of an automobile and is so constructed that the handle 25 of the tool may be grasped in the hand to hold either the outer convex surface of the anvil 27 or the curved end thereof against the indented structure while bumping out blows are delivered to the exposed or outer surface of the indented structure. The handle 25 is made relatively heavy as shown so that the weight or inertia of rest of the entire tool will be sufficient to withstand the bumping out blows.

The tool as shown in Figures 7 to 10 inclusive is what is termed a wide heavy duty sill spoon and it comprises a handle 28 of appropriate length and of polygonal cross section and has a tapered end 29 which merges into an inclined anvil 30 curved lengthwise thereof from end to end. The rear face of the anvil 30 is of arcuate curvature transversely. The anvil 30 gradually decreases in thickness from its inner toward its outer end and is of flaring contour throughout. The forward face of the anvil 30 at the outer portion thereof is beveled as at 31. The free end of the anvil 30 is rounded, and the anvil is disposed at an acute angle with respect to the longitudinal axis of the handle 28 and is of less thickness and of less length than the anvil 27. The angular disposition of the anvil 30 is substantially the same as that of the anvil 27.

The form of tool shown in Figures 11 to 14, both inclusive, is what is termed a special door spoon and it comprises a handle 32 of appropriate length and of polygonal cross section. The handle 32 has a tapered end 33 which merges into an inclined anvil 34 upon a slight curve from end to end thereof and which is disposed at an obtuse angle with respect to the handle 32. The anvil 34 is disposed at a greater angle than the anvils 27 and 30. The anvil 34 gradually decreases in thickness from its inner toward its outer end and has its outer face of arcuate curvature in transverse section. The anvil 34 gradually increases in width from its inner towards its outer end. The anvil 34 is of flared contour and provided with a semi-oval shaped free end.

The anvil 34 is of less thickness than the anvil 27 or 30, but it is of greater width than either of the anvils 27 or 30.

The tool as shown in Figures 15 to 19 is what is termed a double end driving spoon and it includes a bar-like handle 35 of appropriate length and preferably of polygonal cross section to facilitate grasping the same firmly in the hand. The handle 35 is tapered at one end as at 36 and merges into an anvil 37 curved in the direction of its length and disposed at an acute angle with respect to the longitudinal axis of the handle. The anvil 37 while relatively thick throughout its length gradually decreases in thickness from its inner toward its outer end and the outer face of the anvil which constitutes the bumping surface is of arcuate curvature transversely and longitudinally. The free end of the anvil 37 is positioned beyond the plane of the handle 35. The anvil 37 in the construction shown is of uniform width throughout. The free end of the anvil 37 is beveled as indicated at 38. This tool is adapted for use in various bumping out operations, and also constitutes a powerful prying tool for bending the distorted portion of an automobile back into place.

The handle 35 has a curved portion 36′ at its other end which merges into a relatively thick, laterally extending inclined flaring anvil 37′ which gradually decreases in thickness from its inner to its outer end. The anvil 37′ is of greater width than anvil 37 and its outer end is shaped to form the relatively square bumping-out shoulder or abutment 38′. The anvil 37′ extends from the handle 35 in an opposite direction from that of the anvil 37 and is reversely bent with respect to the handle; that is, the anvil 37′ is so positioned that its outer face forms an obtuse angle with the extended longitudinal axis of the handle and is given only a slight curve in the direction of its length.

As a result of this reversely bent arrangement of the anvil 37′ it is well adapted for use in various prying operations and its outer face forms a bumping-out service adapted to be held against the work in various bumping-out operations, while its outer end 38 is also adapted to be held against the various portions of an automobile to be bumped out. The construction of this double ended bumping-out tool of Fig. 15 is such that either anvil may be conveniently grasped by the workman to hold the opposite anvil against the work while performing the bumping-out operation.

The form of tool shown in Figures 20 to 24 is what is termed a body post spoon and includes a handle 39 of appropriate length and of polygonal cross section and which has a tapered end 40 which merges into an anvil 41, which is disposed at an obtuse angle with respect to the handle 39 and curved lengthwise thereof. The angle upon which the anvil 41 is disposed is less than the angular disposition of the other anvils referred to. The anvil 41 gradually decreases in thickness from its inner toward its outer end and is of arcuate curvature transversely of its outer face. The anvil 41 is of uniform width from end to end with the exception of an inner flaring portion of materially less length than the length of the part of uniform width.

In each of the bumping-out tools illustrated in the drawings the anvil is disposed at an angle to the handle portion of the tool to facilitate the presentation of the curved outer face of the anvil to the indented surface that is to be bumped out, and the handle in each construction is made sufficiently heavy to cause the inertia of rest of the tool to resist the bumping out blows delivered to the outer or exposed surface of the indented structure. The anvils are disposed at various angles to the handles for use in different bumping out operations and to facilitate the placing of an anvil against a more or less obstructed surface.

What I claim is:

1. A bumping-out tool for removing indentations in the metal structure of a vehicle, comprising a bar-like handle having a curved coupling portion extending from each end of the handle, and a tapered elongated anvil provided at each end of the handle and connected to the handle by said coupling portions to extend in opposite directions from the longitudinal axis of the handle and one anvil being disposed at a greater angle to the handle than the other.

2. A bumping-out tool for removing indentations in the metal structure of a vehicle, comprising a relatively heavy bar-like handle, a tapered elongated anvil provided at each end of the handle and formed rigid therewith to extend in opposite directions from the longitudinal axis of the handle and one anvil being disposed at a greater angle to the handle than the other.

3. A bumping-out tool for removing indentations in the metal structure of a vehicle comprising a relatively heavy bar-like handle, a tapered elongated anvil provided at each end of the handle and formed rigid therewith to extend in opposite directions from the handle, each anvil having a curved bumping surface extending lengthwise of the anvil and one anvil being disposed at a greater angle to the handle than the other.

4. A bumping-out tool for removing indentations in the metal structure of a vehicle, comprising a bar-like handle, an elongated anvil provided at each end of the handle and formed rigid therewith to extend in opposite directions from the longitudinal axis of the handle, each anvil having a curved bumping surface and one anvil having its outer bumping surface disposed at an acute angle to the extended axis of the handle and the other having its outer bumping surface disposed at an obtuse angle to the extended axis of the handle.

5. A bumping-out tool for removing indentations in the metal structure of a vehicle, comprising a bar-like handle, having its opposite ends flattened and bent laterally in opposite directions from the longitudinal axis of the handle to form anvils provided with curved bumping surfaces extending longitudinally of the anvils.

6. A bumping-out tool for removing indentations in the metal structure of a vehicle, comprising a bar-like handle having its opposite ends flattened and bent laterally in opposite directions from the longitudinal axis of the handle to form anvils of greater width than the handle and provided with bumping surfaces extending longitudinally of the anvils.

7. A bumping-out tool for removing indentations in the metal structure of a vehicle comprising a relatively heavy bar-like handle, a flattened elongated anvil provided at each end of the handle and formed rigid therewith to extend laterally in opposite direction from the longitudinal axis of the handle and one anvil being disposed at a greater angle to the handle than the other.

8. A bumping-out tool for removing indentations in the metal structure of a vehicle, comprising a bar-like handle having one end flattened and reversely bent to form a laterally extending anvil provided with an outer bumping surface that is disposed at an obtuse angle to the extended longitudinal axis of the handle.

9. A bumping-out tool for removing indentations in the metal structure of a vehicle, comprising a bar-like handle having one end flattened and bent laterally to the handle at nearly a right angle thereto to form a laterally extending anvil provided with an outer bumping surface and a shoulder at its outer end.

10. A bumping-out tool for removing indentations in the metal structure of a vehicle, comprising a bar-like handle having one end flattened and bent laterally to the handle at a pronounced angle to form a laterally extending anvil provided with an outer bumping surface and a shoulder at its outer end.

In testimony whereof, I affix my signature hereto.

WILLIAM FERGUSON.